United States Patent
Pesonen et al.

(10) Patent No.: US 9,600,099 B2
(45) Date of Patent: Mar. 21, 2017

(54) DEVICE FOR INTERACTION WITH TOUCH SCREEN

(71) Applicant: Rovio Entertainment Ltd, Espoo (FI)

(72) Inventors: Mika Pesonen, Espoo (FI); Johannes Rajala, Espoo (FI)

(73) Assignee: ROVIO ENTERTAINMENT LTD, Espoo (FI)

(*) Notice: Subject to any disclaimer, the term of this patent is extended or adjusted under 35 U.S.C. 154(b) by 111 days.

(21) Appl. No.: 14/340,603

(22) Filed: Jul. 25, 2014

(65) Prior Publication Data

US 2016/0026262 A1    Jan. 28, 2016

(51) Int. Cl.
| | |
|---|---|
| *G06F 3/045* | (2006.01) |
| *G06F 3/038* | (2013.01) |
| *G06F 3/0488* | (2013.01) |
| *G06F 3/041* | (2006.01) |

(52) U.S. Cl.
CPC ............ *G06F 3/038* (2013.01); *G06F 3/0416* (2013.01); *G06F 3/0488* (2013.01)

(58) Field of Classification Search
CPC ...... G06F 3/0317; G06F 3/0321; G06F 3/033; G06F 3/03545; G06F 3/03547; G06F 3/0414; G06F 3/044

USPC .................... 345/173–183; 178/18.01–18.09, 178/20.01–20.04
See application file for complete search history.

(56) References Cited

U.S. PATENT DOCUMENTS

| | | | |
|---|---|---|---|
| 5,714,972 A * | 2/1998 | Tanaka et al. ................ 345/156 |
| 2002/0079143 A1 * | 6/2002 | Silverstein et al. ....... 178/18.01 |
| 2002/0158921 A1 * | 10/2002 | Silverstein .................... 345/864 |
| 2003/0133629 A1 * | 7/2003 | Sayers .......................... 382/313 |
| 2013/0196766 A1 * | 8/2013 | Leyland et al. ................ 463/36 |

* cited by examiner

*Primary Examiner* — Vijay Shankar (74) *Attorney, Agent, or Firm* — Squire Patton Boggs (US) LLP (57) ABSTRACT

According to an example aspect of the present invention, there is provided an apparatus comprising at least one receiver configured to receive an identifier and an indication of at least one new touch point detected on a touch sensitive screen, and at least one processing core configured to cause transmission of a disable touch point instruction, to determine whether the at least one new touch point disappears from the touch sensitive screen, and responsive to a determination that the at least one new touch point disappears from the touch sensitive screen, to associate a location on the touch sensitive screen with the identifier.

27 Claims, 6 Drawing Sheets

DEVICE FOR INTERACTION WITH TOUCH SCREEN

FIELD OF INVENTION

The present invention relates to interacting with a touchscreen using a physical device.

BACKGROUND OF INVENTION

Interacting with data may be accomplished via an operating system, such as the Linux operating system, wherein a user may input, using a keyboard, textual commands into a command window displayed on a screen device. Responsive to the textual commands, the operating system may perform operations on data, wherein the data may be stored on data files. For example, data files may be copied, moved, archived or compressed in dependence of the textual commands input by the user.

Using textual commands requires a level of skill that many consumers do not have, and have no inclination to acquire, wherefore graphical user interfaces have been developed.

Some operating systems, such as Windows, feature a graphical representation of a desktop with icons representing programs, files and folders. Using a pointing device, such as for example a computer mouse, a user may activate, delete or move the icons to cause the operating system to take actions the user wishes. Using such a graphical user interface renders largely unnecessary the use of textual commands when performing most routine actions on computers.

Using a pointing device may be inconvenient in some circumstances, such as when a user is travelling or when a pointing device is simply not available.

Tablet computers and smartphones may be furnished with touch screens and operating systems designed to be used via touch screen inputs. When using a touchscreen, a user may use his fingers as pointing devices which renders a separate pointing device unnecessary. Touchscreen inputs may comprise, for example, taps, long presses and gestures such as swipes. Touchscreens come in different sizes, ranging from pocket-sized smartphone touchscreens to wall-mounted touchscreens used in corporate premises.

SUMMARY OF THE INVENTION

According to a first aspect of the present invention, there is provided an apparatus comprising at least one receiver configured to receive an identifier and an indication of at least one new touch point detected on a touch sensitive screen, and at least one processing core configured to cause transmission of a disable touch point instruction, to determine whether the at least one new touch point disappears from the touch sensitive screen, and responsive to a determination that the at least one new touch point disappears from the touch sensitive screen, to associate a location on the touch sensitive screen with the identifier.

Various embodiments of the first aspect may comprise at least one feature from the following bulleted list:
  the location on the touch sensitive screen is a location where the at least one new touch point was detected
  the identifier comprises an identifier of an accessory external to the apparatus
  the apparatus is configured to receive the identifier via a wireless link and to transmit the disable touch point instruction via the wireless link
  determining whether the at least one new touch point disappears from the touch sensitive comprises determining whether the at least one new touch point disappears from the touch sensitive screen within a predefined length of time from transmission of the disable touch point instruction
  the at least one processing core is further configured to assign a device identifier to a device associated with the accessory
  the at least one processing core is configured to, subsequently to associating the location on the touch sensitive screen with the identifier, cause a predetermined pattern to be displayed on the touch sensitive screen at the location
  the predetermined pattern comprises a wheel pattern
  the at least one new touch point comprises at least two new touch points
  the at least one receiver is further configured to receive an indication of at least one further new touch point detected on the touch sensitive screen, the at least one processing core is further configured to responsively cause transmission of a second disable touch point instruction, and responsive to a determination the at least one further new touch point disappears from the touch sensitive screen, to associate a location of the at least one further new touch point on the touch sensitive screen with the identifier.

According to a second aspect of the present invention, there is provided an apparatus, comprising at least one transmitter configured to cause transmission of an identifier of an accessory associated with the apparatus, at least one processing core configured to activate at least one of a plurality of configurable touch points, at least one receiver configured to receive a disable touch point instruction, wherein responsive to the disable touch point instruction the at least one processing core is configured to cause deactivation of the at least one touch point.

Various embodiments of the second aspect may comprise at least one feature from the following bulleted list:
  The apparatus according to claim 11, wherein the plurality of configurable touch points comprises a plurality of electrical capacitance circuits
  the apparatus is configured to obtain the identifier of the accessory via a near field communication apparatus
  the at least one receiver is further configured to receive a device identifier
  the at least one processing core is configured to activate at least one of the plurality of configurable touch points in dependence of the device identifier
  the at least one processing core is configured to activate the at least one of the plurality of configurable touch points responsive to a determination, based on first sensor information, that the apparatus has moved
  the apparatus is configured to obtain second sensor information, and based on the second sensor information to determine the apparatus has rotated, and to cause transmission of information describing the rotation.

According to a third aspect of the present invention, there is provided a method comprising receiving, in an apparatus, an identifier and an indication of at least one new touch point detected on a touch sensitive screen, causing transmission of a disable touch point instruction, determining whether the at least one new touch point disappears from the touch sensitive screen, and associating a location on the touch sensitive screen with the identifier responsive to determining that the at least one new touch point disappears from the touch sensitive screen.

Various embodiments of the third aspect may comprise at least one feature corresponding to a feature in the bulleted list laid out above in connection with the first aspect.

According to a fourth aspect of the present invention, there is provided a method, comprising causing transmission, at an apparatus, of an identifier of an accessory associated with the apparatus, activating at least one of a plurality of configurable touch points, receiving a disable touch point instruction, and, responsive to the disable touch point instruction, causing deactivation of the at least one touch point Various embodiments of the fourth aspect may comprise at least one feature corresponding to a feature in the bulleted list laid out above in connection with the second aspect.

According to a fifth aspect of the present invention, there is provided an apparatus comprising means for receiving an identifier and an indication of at least one new touch point detected on a touch sensitive screen, means for causing transmission of a disable touch point instruction, means for determining whether the at least one new touch point disappears from the touch sensitive screen, and means for associating a location on the touch sensitive screen with the identifier responsive to determining that the at least one new touch point disappears from the touch sensitive screen.

According to a sixth aspect of the present invention, there is provided an apparatus comprising means for causing transmission of an identifier of an accessory associated with the apparatus, means for activating at least one of a plurality of configurable touch points, means for receiving a disable touch point instruction, and means for causing deactivation of the at least one touch point responsive to the disable touch point instruction.

According to a seventh aspect of the present invention, there is provided a non-transitory computer readable medium having stored thereon a set of computer readable instructions that, when executed by at least one processor, cause an apparatus to at least receive, in an apparatus, an identifier and an indication of at least one new touch point detected on a touch sensitive screen, cause transmission of a disable touch point instruction, determine whether the at least one new touch point disappears from the touch sensitive screen, and associate a location on the touch sensitive screen with the identifier responsive to determining that the at least one new touch point disappears from the touch sensitive screen.

According to an eighth aspect of the present invention, there is provided a non-transitory computer readable medium having stored thereon a set of computer readable instructions that, when executed by at least one processor, cause an apparatus to at least cause transmission, at an apparatus, of an identifier of an accessory associated with the apparatus, activate at least one of a plurality of configurable touch points, receive a disable touch point instruction, and responsive to the disable touch point instruction, cause deactivation of the at least one touch point.

According to a ninth aspect, there is provided a system comprising at least one apparatus in accordance with the first aspect and at least one apparatus in accordance with the second aspect.

INDUSTRIAL APPLICABILITY

At least some embodiments of the present invention find industrial application in enabling effective interaction with touchscreen devices that support a limited number of simultaneous touch points.

DETAILED DESCRIPTION OF EXAMPLE EMBODIMENTS

By disabling upon configurable touch points in physical items, a touch sensitive screen can identify a larger number of physical devices placed on it. This allows use of touch screens with a capability to detect a smaller number of simultaneous touch interactions.

Figure 1:
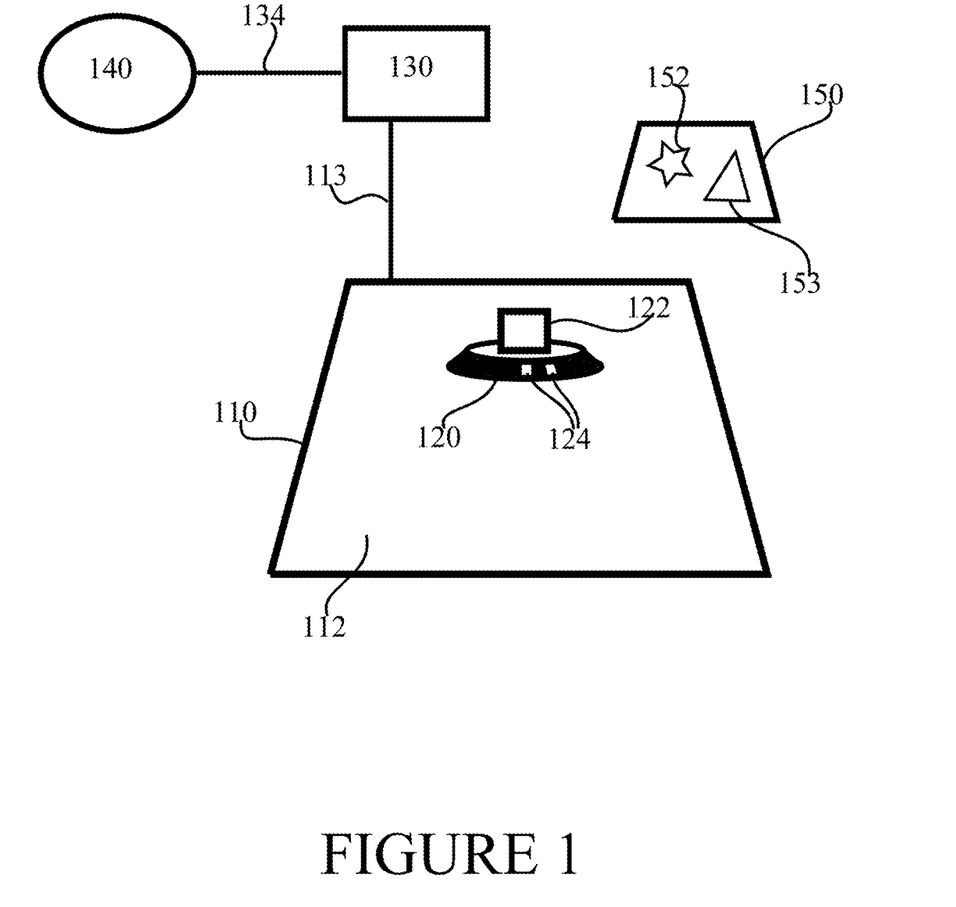
FIG. 1 illustrates an example system capable of supporting at least some embodiments of the present invention.

FIG. 1 illustrates an example system capable of supporting at least some embodiments of the present invention. Illustrated in FIG. 1 is base 110, which may comprise, for example, a tablet computer, phablet device or another similar device. Base 110 comprises touch sensitive screen 112, which may be referred to as touch screen 112 in brief. Touch screen 112 may comprise a capacitive touch screen, for example. Touch screen 112 may be of 7 inch size, for example. Base 110 may, optionally, be in communication with computer 130 via connection 113, which connection may comprise a wire-line connection or at least in part a wireless connection. Computer 130 may, optionally, be connected to network 140 via connection 134. Devices in FIG. 1 are not necessarily drawn to scale.

Device 120 may comprise an apparatus that comprises at least one communications interface. Device 120 may comprise a plurality of configurable touch points, each of which may comprise an electrical capacitance circuit. The plurality of configurable touch points may be disposed in device 120 on a side that faces touch screen 112 when device 120 is placed on base 110, to rest thereon. The plurality of configurable touch points may be arranged along a surface of device 120 in a linear arrangement, or alternatively in a circular arrangement. Device 120 may comprise at least one, and optionally at least two, physical buttons 124.

Device 120 may be associated with accessory 122. Being associated with accessory 122 may comprise being paired with accessory 122, for example via a Bluetooth pairing procedure. Alternatively, device 120 may become associated with accessory 122 via a touch interaction when accessory 122 is placed on top of device 120. Such a touch interaction may occur via an electrically conductive connector disposed between device 120 and accessory 122, or via a near-field communications, NFC, connection, for example.

Accessory 122 may comprise, for example, a handle, a smart card encoded with a user-specific code or a toy character. Accessory 122 may rest on top of device 120, for example in a slot or recess arranged in device 120 to receive it, wherein such a recess or slot may be of similar shape to a part of accessory 122 that is to be inserted into the recess or slot. Such a recess or slot may comprise an electrical connector to form a direct link between device 120 and accessory 122. Alternatively, accessory 122 may communicate with device 120 via a wireless or cable link. A wireless or cable link may be useful in case accessory is not in physical contact with device 120. Accessory 122 may be configured to provide an identifier of itself to device 120. Accessory 122 may provide the identifier via a link. The identifier of accessory 122 may be specific to the accessory unit 122, or specific to a type of accessory that accessory 122 represents. For example, the identifier may indicate the accessory is a certain type of handle, the identifier may indicate an IP address of accessory 122 or the identifier may comprise an identity of a user associated with accessory 122. An IP address may comprise an IPv4 or IPv6 address. Using an IPv6 address may enable identification of accessory 122 from among a large group of accessories, wherein the IPv6 address may be configured into accessory 122 in connection with manufacture of accessory 122, for example.

Accessory 122 may be powered by a battery comprised in accessory 122, and/or accessory 122 may be powered via device 120 via an electrical connector between device 120 and accessory 122. In some embodiments, accessory 112 is powered wirelessly, for example when accessory 122 rests on device 120 it may be powered by device 120 in accordance with the Qi wireless charging standard.

Device 120 may be paired with base 110, for example via a cable connection or via a Bluetooth pairing. The pairing may occur over the at least one communications interface of device 120. Once device 120 is placed on top of base 110, in particular on touch screen 112, with at least one of the configurable touch points active, touch screen 112 will detect the at least one active touch point. In some embodiments, device 120 will have at least two active touch points, which touch screen 112 will detect when device 120 is placed on touch screen 112. Device 120 may provide, via the pairing, the identifier of accessory 122 to base 110.

Responsive to detecting the at least one active touch point on touch screen 112, base 110 may instruct device 120 to disable its configurable touch points. Such instructing may take place via the pairing between base 110 and device 120, for example. Responsive to the instructing, device 120 may disable its active configurable touch points, which touch screen 112 will detect. Thus base 110 is enabled to deduce that the detected touch points were configurable touch points of device 120, and base 110 may associate device 120 with a location on touch screen 112 where the touch points were detected prior to their deactivation. Associating device 120 with a location on touch screen 112 may comprise associating the identifier of accessory 122 with the location on touch screen 112. Base 110 may associate the disappearance of the at least one touch point with the instruction to disable configurable touch points, for example, responsive to the touch points disappearing from touch screen 112 within a predetermined space of time after transmission of the disable instruction from base 110. Examples of such predetermined spaces of time include 50 or 100 milliseconds. It would be unlikely that, for example, two or more touch points caused by a user's fingers would both disappear from touch screen 112 within 100 milliseconds of transmission of the disable instruction.

Subsequent to the disabling of the at least one configurable touch point of device 120, another device like device 120 may be placed on touch screen 112, and the process described above may be repeated. By instructing the configurable touch points to be disabled, a touch screen can be used to identify several devices such as device 120, even if the touch screen can only detect a limited number of touch points at any given time. In case the touch points on device 120 were not disabled, a maximum number of simultaneous touch points of touch screen 112 could be reached after only one or two devices such as device 120 are placed on touch screen 112. A user may need at least one touch point for interacting with base 110 via touch screen 112 in addition to placing on it devices such as device 120. Touch screens that can detect large numbers of simultaneous touch points are more complex to manufacture, and they may suffer of slowness in response to input, so using a touch screen capable of detecting, for example, only five simultaneous touch points may be beneficial.

Responsive to base 110 determining that device 120 has disabled its configurable touch points responsive to the disable instruction, base 110 may assign a stand identifier to device 120. The stand identifier may be communicated from base 110 to device 120 over the pairing, for example.

Surface 150 may comprise, for example, a paper, plastic or metallic sheet with imprinted thereon at least one token. Surface 150 may be foldable and/or specific to a user. Illustrated in FIG. 1 on surface 150 are tokens 152 and 153. Tokens 152 and 153 may comprise, for example, near-field communication, NFC, tags. Alternatively, tokens 152 and 153 may comprise barcodes. When device 120 is placed on touch screen 112, a user may use accessory 122 to select one of the at least one token on surface 150. Such selecting may comprise, for example, touching accessory 122 on the token to be selected. Where the tokens comprise barcodes, accessory 122 may comprise a barcode reader or camera to enable detection of the barcodes. After the selecting, accessory 122 may be replaced on, or associated with, device 120. Accessory 122 may inform device 120 of the selected token, and device 120 may inform base 110, via the pairing of device 120 to base 110, of the selected token. The selected token may correspond to a function or capability in a virtual space corresponding to a view displayed in touch screen 112. Effectively, surface 150 may act as a menu and tokens comprised in surface 150 may correspond to functions comprised in a menu.

As an example of use of surface 150, a user may place device 120 on a location on touch screen 112 that currently displays an element in a virtual space that the user wishes to interact with. For example, where the virtual space is a virtual representation of an industrial process, the user may place device 120 on a location on touch screen 112 that displays a virtual space element that corresponds to an aspect of the industrial process the user wishes to modify. As described above, base 110 ascertains the location of device 120 on touch screen 112. The user may then select token 152, using accessory 122, and replace accessory 122 on device 120 as is illustrated in FIG. 1. Base 110 is informed of an identity of token 152 as described above, and the element in virtual space is accordingly modified. For example, token 152 may correspond to disabling an aspect of the industrial process, which is caused to occur via the element in the virtual space that corresponds to the aspect of the industrial process the user wants to disable. The virtual space element on touch screen 112 may change in visual appearance to indicate the interaction with it has been successful. In this example, a text "Instructed to shutdown" may appear in connection with the virtual space element, which will later on update to "Shut down" when the aspect of the industrial process has completed shutdown. In some embodiments, a user may confirm the intended interaction with one of physical buttons 124, before the interaction is communicated to the virtual space as definite.

Figure 2A:
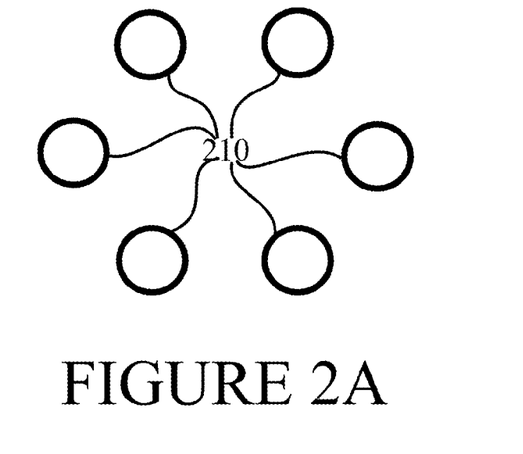
FIG. 2A illustrates a first touch point pattern usable in at least some embodiments of the present invention.

FIG. 2A illustrates a first touch point pattern usable in at least some embodiments of the present invention. In the touch point pattern of FIG. 2A, the configurable touch points of device 120 are arranged in a circular fashion under device 120. Device 120 can activate one or several of the configurable touch points at the same time. In some embodiments, device 120 is configured to activate the configurable touch points according to a sequence, for example, each touch point may be activated in turn, or two touch points may be active at each time. Responsive to the disable instruction, all active configurable touch points may be disabled, for example simultaneously.

Figure 2B:
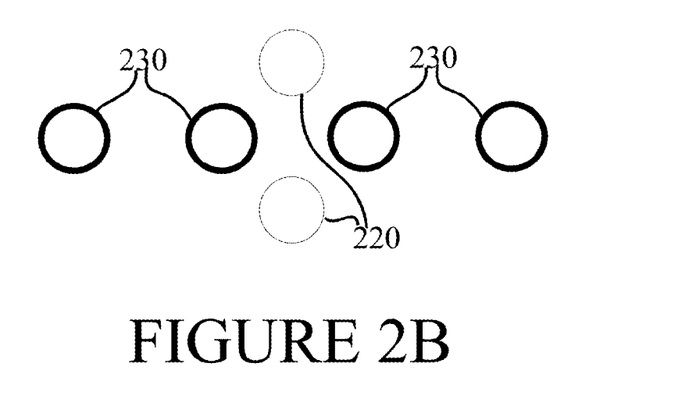
FIG. 2B illustrates a second touch point pattern usable in at least some embodiments of the present invention.

FIG. 2B illustrates a second touch point pattern usable in at least some embodiments of the present invention. In the touch point pattern of FIG. 2B, two configurable touch points, 220, act as an anchor. Base 110 may be configured with information informing of a distance between anchor touch points 220, to determine that the touch points may be configurable touch points of a device. In addition to anchor touch points 220, device 120 may be configured to enable at least one of configurable touch points 230. Responsive to the disable instruction, all active configurable touch points may be disabled, for example simultaneously.

Figure 2C:
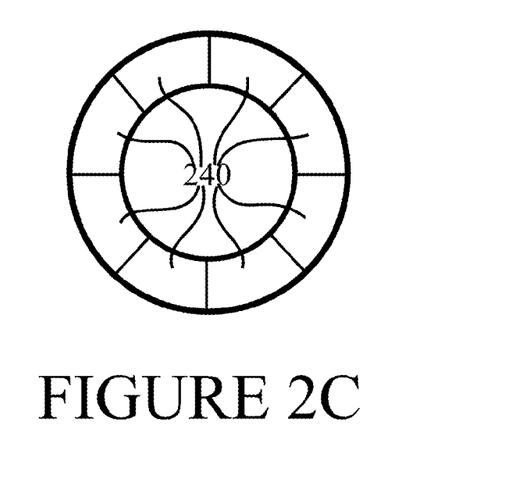
FIG. 2C illustrates a visual pattern usable in at least some embodiments of the present invention.

FIG. 2C illustrates a visual pattern usable in at least some embodiments of the present invention. The visual pattern of FIG. 2C may be displayed on touch screen 112 responsive to base 110 associating device 120 with a location on touch screen 112. The visual pattern of FIG. 2C may be displayed, based on the association, under device 120. A camera sensor comprised in device 120 may be arranged to obtain sensor data of the displayed visual pattern, so that device 120 thereby is enabled to determine if a user rotates device 120 on touch screen 112, or if the user moves device 120 on touch screen 112.

In FIG. 2C, the visual pattern, which may be predetermined, comprises a wheel pattern with colour segments 240. The number of colour segments is not limited to the number illustrated in FIG. 2C. Black and white should be considered as colours. In general any visual pattern that enables device 120, via a camera sensor element, to determine movement and/or rotation of device 120 on touch screen 112 may be used. Additionally or alternatively to a camera, in some embodiments light sensors may be employed to detect the visual pattern.

In case device 120 determines, based on sensor data obtained of a visual pattern displayed under it, that it has moved and/or rotated on touch screen 112, device 120 may inform base 110 of this via the pairing between base 110 and device 120. This informing may comprise transmission of a message comprising at least one of the accessory identifier and the stand identifier discussed above. In connection with determining movement, device 120 may enable at least one of its configurable touch points, which base 110 will detect via touch screen 112 once device 120 is re-placed on touch screen 112. Responsive to detection of the at least one active touch point, base 110 may transmit to device 120 a disable touch points instruction, for example via the pairing between base 110 and device 120. Upon receipt of the disable instruction, device 120 may disable the active configurable at least one touch point, which base 110 again detects via touch screen 112. Responsively, base 110 may associate device 120 with a new location on touch screen 112, namely the location where the at least one touch point was disabled responsive to the disable instruction sent after device 120 moved and/or rotated. Base 110 may cause touch screen 112 to re-display the visual pattern, again under device 120, this time at the new location.

In some embodiments, device 120 is configured to, responsive to determining device 120 is moved from its location on touch screen 112, activate the at least one configurable touch point in dependence of a stand identifier of device 120. This may facilitate further the detection of device 120 on touch screen 112 at its new location, as base 110 may assume new touch points it detects are comprised in device 120 in case a pattern defined by the activated touch points is consistent with the stand identifier.

Figure 3:
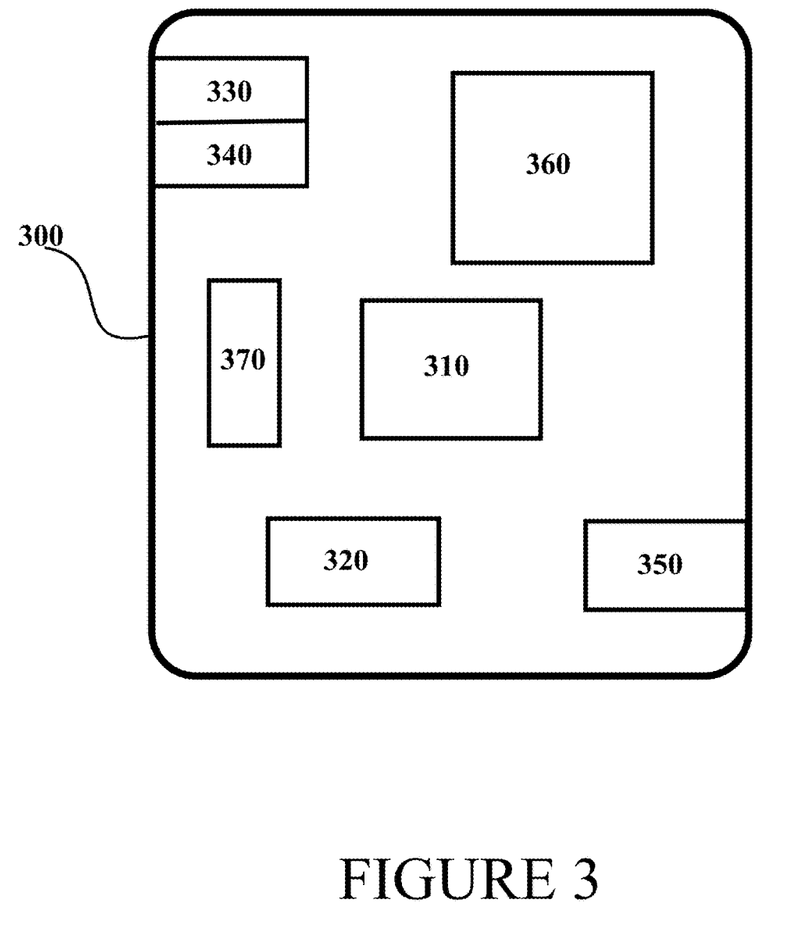
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as device 120 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet, Bluetooth, Bluetooth-low energy and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
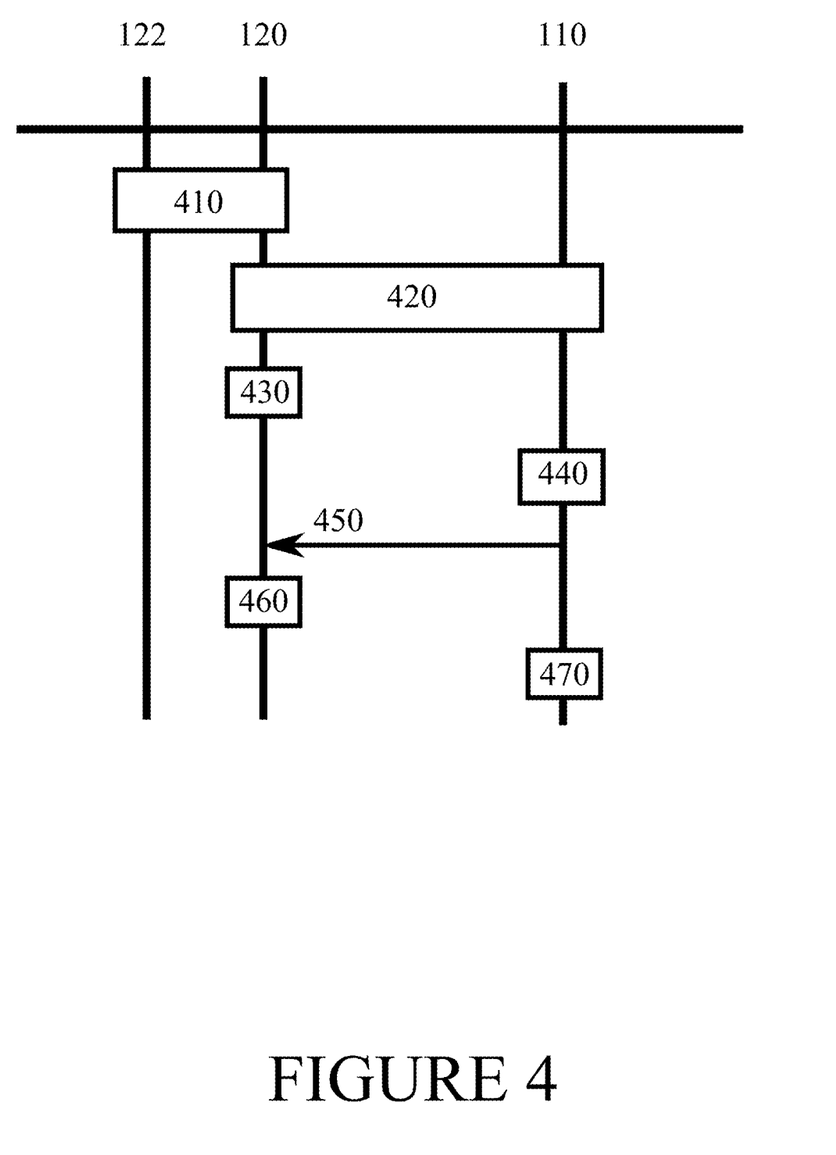
FIG. 4 is a signalling diagram illustrating signalling in accordance with at least some embodiments of the present invention.

FIG. 4 is a signalling diagram illustrating signalling in accordance with at least some embodiments of the present invention. On the vertical axes are disposed, from left to right, accessory 122, device 120 and base 110. Time advances from top toward the bottom.

In phase 410, accessory 122 and device 120 are associated with each other. Such association may comprise a pairing, as described above. In phase 420, device 120 and base 110 are paired together, as described above. Phase 420 may comprise device 120 informing base 110 of an identifier of accessory 122. Although FIG. 4 illustrates phase 410 as preceding phase 420, the order of these two phases could also be reversed, or the phases may even occur at substantially the same time.

In phase 430, device 120 is placed on a touch screen comprised in, or associated with, base 110. In phase 430, at least one configurable touch point of device 120 is active. The at least one active touch point is detected by the touch screen, and the detection is reported to base 110. Base 110 determines the appearance of the active touch point in phase 440. Responsive to phase 440, base 110 causes transmission of a disable instruction to device 120, with which base 110 remains paired. This disable instruction is transmitted in phase 450.

Device 120 disables, in phase 460, the at least one active configurable touch point responsive to the disable instruction of phase 450. The touch screen detects the disappearance of the touch point, and informs base 110 accordingly. Responsively, in phase 470, base 110 associates the location where the touch point disappeared responsive to the disable instruction of phase 450 with device 120. In phase 470, base 110 may cause a visual pattern to be displayed on the touch screen under device 120. An example if such a visual pattern is illustrated in FIG. 2C.

In some embodiments, in case base 110 determines that the at least one touch point does not disappear responsive to the disable instruction of phase 450, base 110 causes a disable instruction to be transmitted to another device with which base 110 is paired. In case the at least one touch point disappears responsive to this message, base 110 may be configured to associate the location on the touch screen where the at least one touch point disappeared with this other device with which base 110 is paired.

Figure 5:
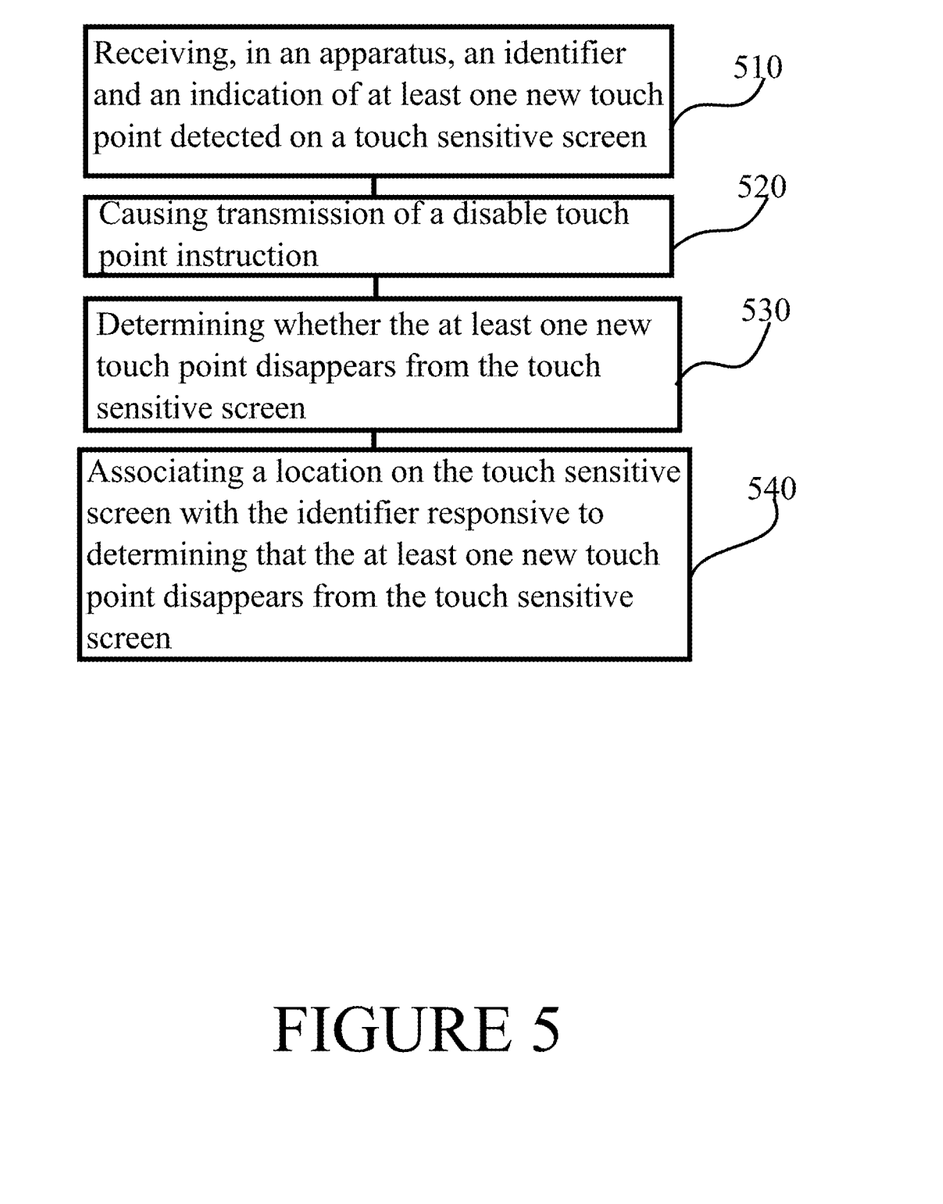
FIG. 5 is a first flow graph of a first method in accordance with at least some embodiments of the present invention.

FIG. 5 is a first flow graph of a first method in accordance with at least some embodiments of the present invention. The phases of the illustrated method may be performed in base 110 or a control device configured to control the functioning of base 110, for example. Phase 510 comprises receiving, in an apparatus, an identifier and an indication of at least one new touch point detected on a touch sensitive screen. The identifier and indication need not be received at the same time. Phase 520 comprises causing transmission of a disable touch point instruction. Phase 530 comprises determining whether the at least one new touch point disappears from the touch sensitive screen. This determining may comprise whether the at least one new touch point disappears from the touch sensitive screen within a predetermined time from transmission of the disable touch point instruction. Finally, phase 540 comprises associating a location on the touch sensitive screen with the identifier responsive to determining that the at least one new touch point disappears from the touch sensitive screen. The associated location may comprise a location where the at least one new touch point was before it disappeared.

Figure 6:
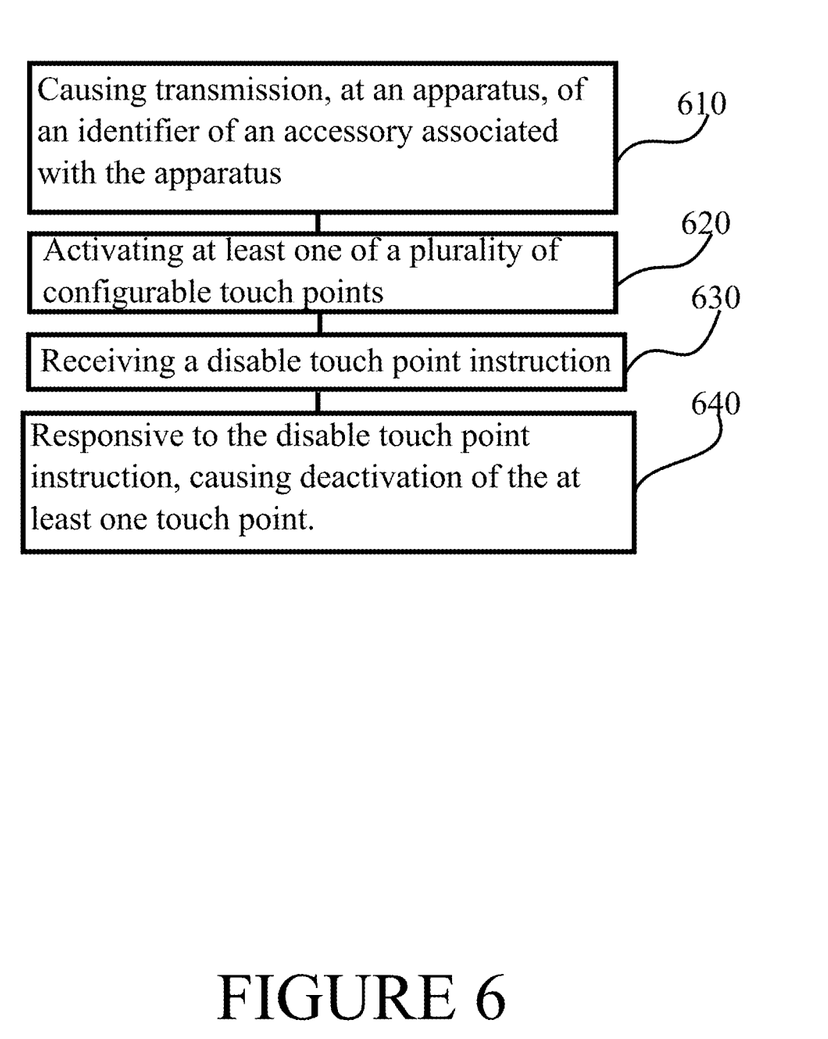
FIG. 6 is a second flow graph of a second method in accordance with at least some embodiments of the present invention.

FIG. 6 is a second flow graph of a second method in accordance with at least some embodiments of the present invention. The phases of the illustrated method may be performed in device 120 or a control device configured to control the functioning of device 120, for example. Phase 610 comprises causing transmission, at an apparatus, of an identifier of an accessory associated with the apparatus. Phase 620 comprises activating at least one of a plurality of configurable touch points. Phase 630 comprises receiving a disable touch point instruction. Finally, phase 640 comprises, responsive to the disable touch point instruction, causing deactivation of the at least one touch point. Phase 610 need not occur before phases 620, 630 and 640, rather it may occur after them or between phase 620 and 630, or between phases 640 and 640.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   at least one receiver configured to receive an identifier and an indication of at least one new touch point detected on a touch sensitive screen; and
   at least one processing core configured to cause transmission of a disable touch point instruction, to determine whether the at least one new touch point disappears from the touch sensitive screen, and responsive to a determination that the at least one new touch point disappears from the touch sensitive screen, to associate a location on the touch sensitive screen with the identifier,
   wherein the at least one receiver is further configured to receive an indication of at least one further new touch point detected on the touch sensitive screen, the at least one processing core is further configured to responsively cause transmission of a second disable touch point instruction, and responsive to a determination the at least one further new touch point disappears from the touch sensitive screen, to associate a location of the at least one further new touch point on the touch sensitive screen with the identifier.

2. An apparatus comprising:
   at least one receiver configured to receive an identifier and an indication of at least one new touch point detected on a touch sensitive screen; and
   at least one processing core configured to cause transmission of a disable touch point instruction, to determine whether the at least one new touch point disappears from the touch sensitive screen, and responsive to a determination that the at least one new touch point disappears from the touch sensitive screen, to associate a location on the touch sensitive screen with the identifier,
   wherein the identifier comprises an identifier of an accessory or device external to the apparatus.

3. The apparatus according to claim 1, wherein the location on the touch sensitive screen is a location where the at least one new touch point was detected.

4. The apparatus according to claim 1, wherein the apparatus is configured to receive the identifier via a wireless link and to transmit the disable touch point instruction via the wireless link.

5. The apparatus according to claim 1, wherein determining whether the at least one new touch point disappears from the touch sensitive comprises determining whether the at least one new touch point disappears from the touch sensitive screen within a predefined length of time from transmission of the disable touch point instruction.

6. The apparatus according to claim 1, wherein the at least one processing core is configured to, subsequently to associating the location on the touch sensitive screen with the identifier, cause a predetermined pattern to be displayed on the touch sensitive screen at the location.

7. The apparatus according to claim 1, wherein the at least one new touch point comprises at least two new touch points.

8. An apparatus, comprising:
   at least one transmitter configured to cause transmission of an identifier of an accessory associated with the apparatus;
   at least one processing core configured to activate at least one of a plurality of configurable touch points; and
   at least one receiver configured to receive a disable touch point instruction,
   wherein responsive to the disable touch point instruction the at least one processing core is configured to cause deactivation of the at least one touch point.

9. The apparatus according to claim 8, wherein the plurality of configurable touch points comprises a plurality of electrical capacitance circuits.

10. The apparatus according to claim 8, wherein the apparatus is configured to obtain the identifier of the accessory via a near field communication apparatus.

11. The apparatus according to claim 8, wherein the at least one receiver is further configured to receive a device identifier.

12. The apparatus according to claim 11, wherein the at least one processing core is configured to activate at least one of the plurality of configurable touch points in dependence of the device identifier or responsive to a determination, based on first sensor information, that the apparatus has moved.

13. The apparatus according to claim 8, wherein the apparatus is configured to obtain second sensor information, and based on the second sensor information to determine the apparatus has rotated, and to cause transmission of information describing the rotation.

14. A method comprising:
receiving, in an apparatus, an identifier and an indication of at least one new touch point detected on a touch sensitive screen;
causing transmission of a disable touch point instruction;
determining whether the at least one new touch point disappears from the touch sensitive screen, and
associating a location on the touch sensitive screen with the identifier responsive to determining that the at least one new touch point disappears from the touch sensitive screen,
wherein the identifier comprises an identifier of an accessory or device external to the apparatus.

15. The method according to claim 14, wherein the location on the touch sensitive screen is a location where the at least one new touch point was detected.

16. The method according to claim 14, wherein determining whether the at least one new touch point disappears from the touch sensitive comprises determining whether the at least one new touch point disappears from the touch sensitive screen within a predefined length of time from transmission of the disable touch point instruction.

17. The method according to claim 14, wherein the at least one processing core is further configured to assign a device identifier to a device associated with the accessory.

18. The method according to claim 14, further comprising, subsequently to associating the location on the touch sensitive screen with the identifier, causing a predetermined pattern to be displayed on the touch sensitive screen at the location.

19. The method according to claim 18, wherein the predetermined pattern comprises a wheel pattern.

20. The method according to claim 14, further comprising receiving an indication of at least one further new touch point detected on the touch sensitive screen, responsively causing transmission of a second disable touch point instruction, and responsive to a determination the at least one further new touch point disappears from the touch sensitive screen, associating a location of the at least one further new touch point on the touch sensitive screen with the identifier.

21. A method, comprising:
causing transmission, at an apparatus, of an identifier of an accessory associated with the apparatus;
activating at least one of a plurality of configurable touch points;
receiving a disable touch point instruction, and
responsive to the disable touch point instruction, causing deactivation of the at least one touch point.

22. The method according to claim 21, further comprising obtaining the identifier of the accessory via a near field communication apparatus.

23. The method according to claim 21, further comprising activating at least one of the plurality of configurable touch points in dependence of the device identifier.

24. The method according to claim 23, wherein the at least one of the plurality of configurable touch points is activated responsive to a determination, based on first sensor information, that the apparatus has moved.

25. The method according to claim 21, further comprising obtaining second sensor information, and based on the second sensor information determining the apparatus has rotated, and causing transmission of information describing the rotation.

26. A non-transitory computer readable medium having stored thereon a set of computer readable instructions that, when executed by at least one processor, cause an apparatus to at least:
receive, in an apparatus, an identifier and an indication of at least one new touch point detected on a touch sensitive screen;
cause transmission of a disable touch point instruction;
determine whether the at least one new touch point disappears from the touch sensitive screen, and
associate a location on the touch sensitive screen with the identifier responsive to determining that the at least one new touch point disappears from the touch sensitive screen,
wherein the identifier comprises an identifier of an accessory or device external to the apparatus.

27. A non-transitory computer readable medium having stored thereon a set of computer readable instructions that, when executed by at least one processor, cause an apparatus to at least:
cause transmission, at an apparatus, of an identifier of an accessory associated with the apparatus;
activate at least one of a plurality of configurable touch points;
receive a disable touch point instruction, and
responsive to the disable touch point instruction, cause deactivation of the at least one touch point.

* * * * *